Figure 1:
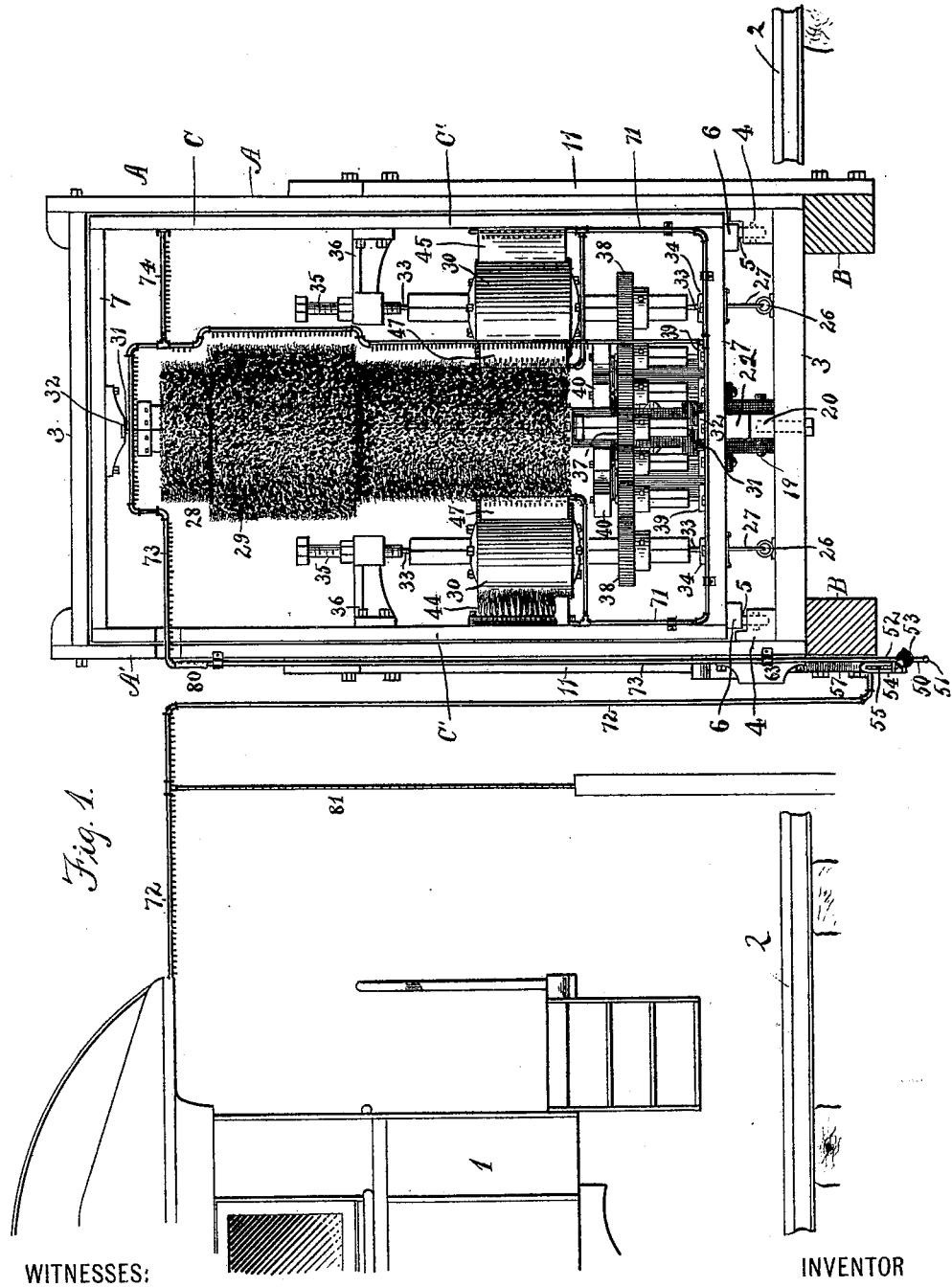

No. 636,906. Patented Nov. 14, 1899.
C. L. KLINE.
CAR WASHING APPARATUS.
(Application filed Oct. 15, 1896.)
(No Model.) 4 Sheets—Sheet 1.

WITNESSES:
C. L. Belcher

INVENTOR
Charles L. Kline,
BY
his ATTORNEY

No. 636,906. Patented Nov. 14, 1899.
C. L. KLINE.
CAR WASHING APPARATUS.
(Application filed Oct. 15, 1896.)

(No Model.) 4 Sheets—Sheet 3.

WITNESSES:
C. L. Belcher

INVENTOR
Charles L. Kline,
BY
G. H. Stockbridge
his ATTORNEY

THE NORRIS PETERS CO., PHOTO-LITHO., WASHINGTON, D. C.

No. 636,906. Patented Nov. 14, 1899.
C. L. KLINE.
CAR WASHING APPARATUS.
(Application filed Oct. 15, 1896.)
(No Model.) 4 Sheets—Sheet 4.
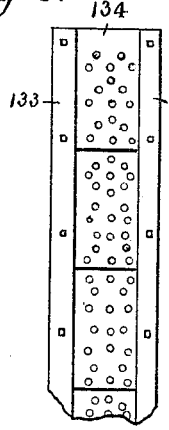
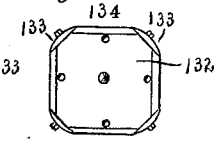
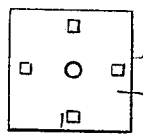
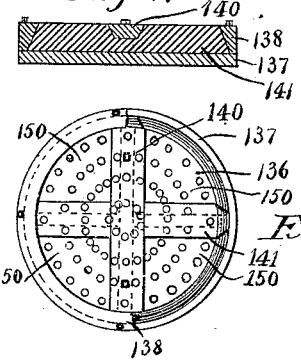
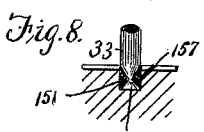
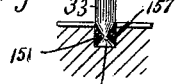
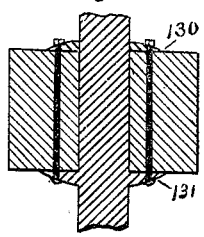
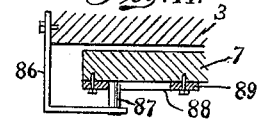
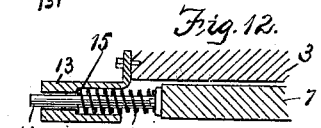
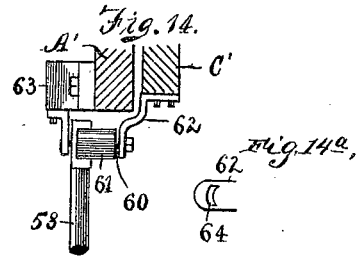
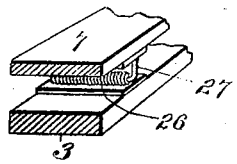
WITNESSES:
C. L. Belcher
H. F. Olney
INVENTOR
Charles L. Kline,
BY
G. H. Stockenridge
his ATTORNEY
THE NORRIS PETERS CO., PHOTO-LITHO., WASHINGTON, D. C.

UNITED STATES PATENT OFFICE.

CHARLES L. KLINE, OF NEW YORK, N. Y.

CAR-WASHING APPARATUS.

SPECIFICATION forming part of Letters Patent No. 636,906, dated November 14, 1899.

Application filed October 15, 1896. Serial No. 608,932. (No model.)

*To all whom it may concern:*

Be it known that I, CHARLES L. KLINE, a citizen of the United States, residing at New York, in the county of New York and State of New York, have invented certain new and useful Improvements in Car-Washing Machinery; and I do hereby declare the following to be a full, clear, and exact description of the invention, such as will enable others skilled in the art to which it appertains to make and use the same.

The machine which I have invented is an automatic cleaning or washing device designed to act upon the sides of railway-cars or other vehicles to cleanse them after they have become soiled in use.

At the present time a large number of workmen are employed about railway-stations to wash the incoming cars, so that they may present a good appearance in the station and before starting on the next trip. It is my object to do away with the necessity of keeping the larger portion of these workmen by providing a machine or automatic apparatus which will accomplish without difficulty and with great quickness the cleansing of the cars.

I prefer that the power for operating the cleansing-brushes which I employ in carrying out my invention should be derived from the momentum of the car or train of cars, as the case may be. I may, however, utilize the power of any suitable motor for moving the brushes for cleansing purposes. Nor would it be an avoidance of my invention if the movement of the car or train should not operate either the motor or the water-controlling valve, such manipulations being left to the duty of a workman, if it is thought best. Of this there will be no need, because my preferred apparatus performs these acts automatically, as will clearly appear hereinafter. It will also appear that I provide for the cleansing of both sides of a car or train at the same time.

In carrying out my invention, or rather in illustrating it in the accompanying drawings, I have assumed that cars intended to be cleaned will be run, as they commonly are, upon a single track having space left at each side for the work of cleaning. In using my invention a machine such as I am about to describe will preferably be set up on each side of the track, and these machines will be automatically operated for cleansing the cars in a manner to be described. Of course the identity of my invention would not be affected by the use of a single machine on only one side of the track; but two machines will naturally be made use of for the sake of economy of time in making the cars clean.

In general I may say that I provide at each side of the track a rigid frame supported upon suitable timbers or other foundations. Combined with each rigid stationary frame is a sliding frame which carries a pair of contact-rollers, preferably of soft rubber, and also a rotary brush of practically the same length as the height of a car side, from the bottom of such side to the molding at the top thereof. The said brush and the said contact-rollers project somewhat into the path of movement of the car side. For this reason the rollers are set in rotation by the movement of the car, and in one form of my apparatus they serve intermediately to cause the rotation of the brush. At the same time the sliding frame carrying the rollers is pushed backward somewhat, thereby operating a valve for letting on the water under pressure into pipes arranged to extend both along the rotary brush and also along the car sides. I prefer to arrange these pipes so that they will extend along the whole length of an average train and to arrange the valve in such a manner that upon its being opened, as described, it will supply water to the whole system of pipes, whereby the cars farther along the track will be wetted and prepared for cleansing before they come into contact with the brush or brushes.

Many modifications of my invention are possible without deviating from the principle thereof, some of which will be set forth in the specific description which follows.

Figure 2:
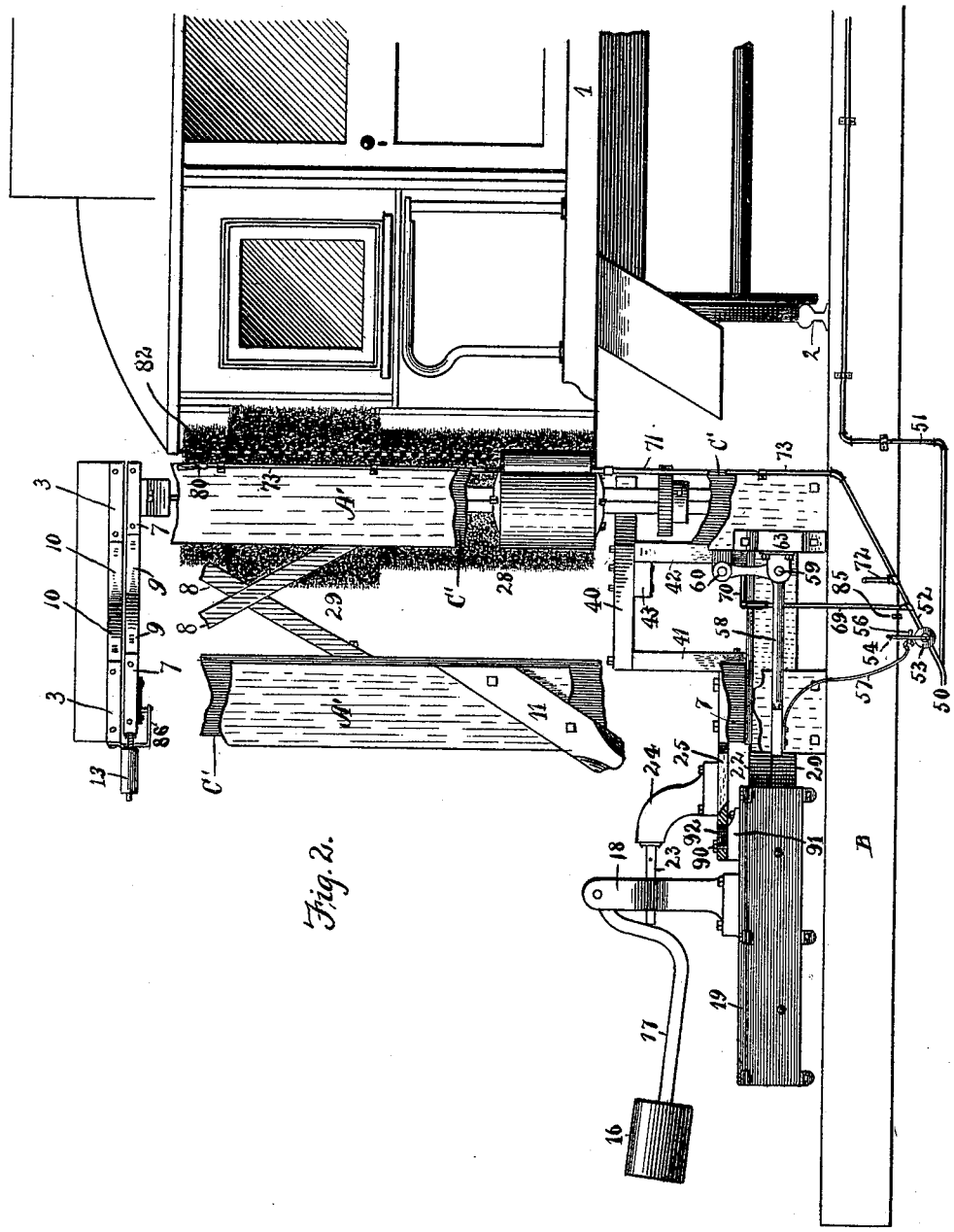
Figure 3:
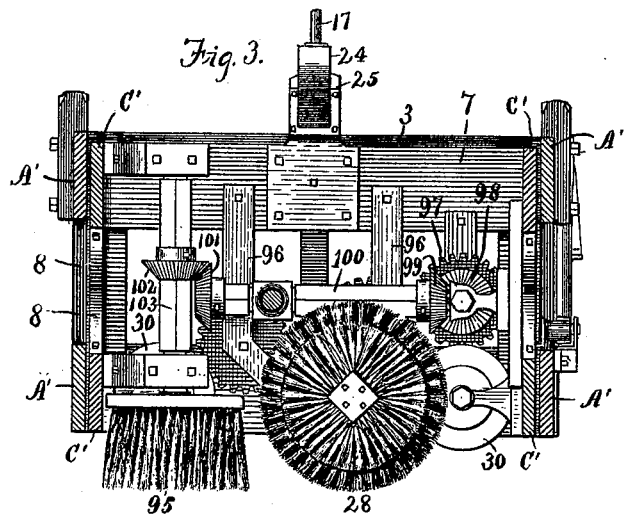
Figure 4:
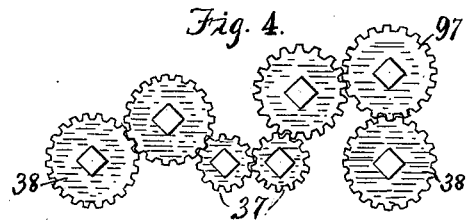
Figure 5:
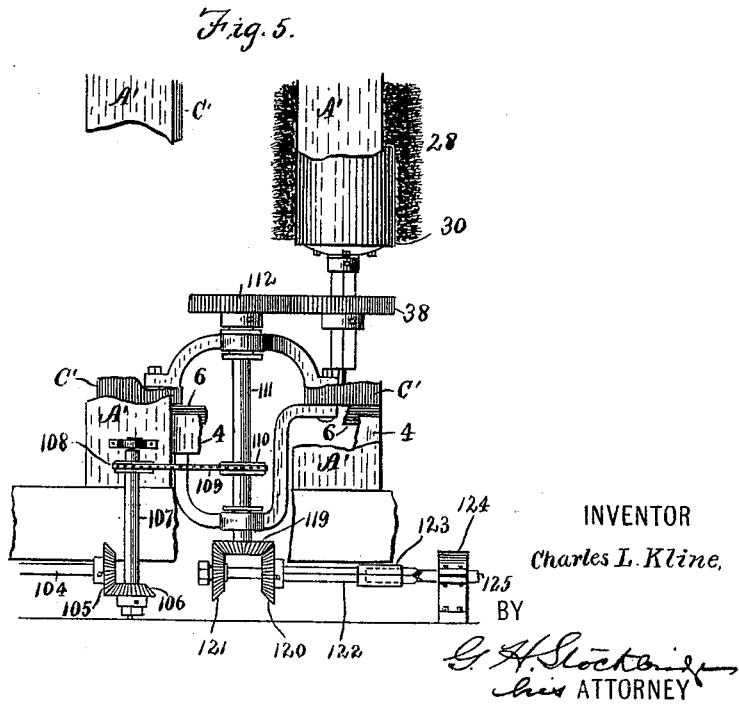

In the drawings, Figure 1 is a front elevation of one of my preferred machines looking at it from across the railway-track. Fig. 2 is a side elevation thereof looking from the left in Fig. 1 and assuming that the car, a portion of which appears in Fig. 1, has passed beyond the machine. Fig. 3 is a plan or top view of a modification, the cross-pieces of both the stationary and the sliding frame being removed. Fig. 4 is a detail of the gearing employed in the modified form of my apparatus. Fig. 5 is a side elevation of a portion of my apparatus as it appears when designed to be operated by an outside source of power. Fig. 6 is an elevation of a portion of the body of one form of my brush, the bristles and the cap at the end being removed. Fig. 6ª is a plan thereof. Fig. 6ᵇ is a top view of the cap. Fig. 7 is a cross-section of the body of a modified form of brush, no bristles being shown. Fig. 7ª is a face view thereof with the bristles removed and a part of the rim broken away. Fig. 8 is a detail of a portion of the pivot-bearings which I prefer to employ. Fig. 9 is a vertical section through the rubber contact used in the modification illustrated in Fig. 5. Fig. 10 is a similar view of the rubber contact illustrated in Figs. 1 and 2. Fig. 11 is a detail of the stop mechanism at the upper part of the stationary and sliding frames for limiting the motion of the latter. Fig. 12 is a detail of a spring connection between the stationary and sliding frames at the top. Fig. 13 is an enlarged front view of the controlling water-valve appearing in Fig. 1. Fig. 14 is a plan view of the connections between the lower parts of the stationary and sliding frames whereby the valve is operated. Fig. 14ª is a detail of a slotted bracket forming part of my apparatus. Fig. 15 is an enlarged view of a spring forming part of my apparatus, and Fig. 16 is a detail perspective of the spring connections between the stationary and the moving frames.

In the drawings my stationary frame A is represented as being supported upon timbers or other foundations, (shown at B B.) The tops of the parts B B are preferably about on a level with the tops of the ties of the railway-track; but this is comparatively immaterial. It is my design to support upon each pair of timbers B B two of my machines on opposite sides of the track. Accordingly the said timbers run under the track-rails and extend far enough on opposite sides thereof to furnish the necessary support for such machines.

In the view represented in Fig. 1 we are looking at the front or face of one of my machines, and a car (shown at 1) is ready to pass along the track (shown at 2) and in front of the machine. The track is broken away, so as to prevent confusion in reading the drawing. In reality the rails would pass in front of the machine. The frame A is made up of side pieces A' A', connected by cross-pieces 3 3. In the corners formed by the lowermost cross-pieces 3 3 and the side pieces A' A' are angular pieces 4 4, to which the said side and cross pieces are bolted and in which are mounted rollers 5 5. Upon these rollers run rails 6 6 underneath my sliding frame C. The said frame C is thus supported within the stationary frame A. The said inner frame is provided with uprights C' C' and with cross-pieces 7 7, forming a frame similar in structure to the outer stationary frame. The inner frame is provided with braces 8 8, as shown in Fig. 2, and at the top of both frames are similar cross-braces 9 9 and 10 10 for strengthening the respective frames. The outer frame is provided with braces 11 11, connecting it with the timbers B B for greater rigidity and strength. It is now understood that the inner frame C is adapted to slide within the outer frame by virtue of the rails 6 6 traveling upon the rollers 5 5. Normally, however, the said inner frame is maintained in its forward position by means of several devices. The first of these is a spring 12. (Illustrated in detail in Fig. 12 of the drawings.) It appears in the illustration as a spiral spring protected by a suitable barrel or housing 13 and surrounding a rod 14. The barrel or housing is attached by a screw or bolt to the cross-piece 3 of the stationary frame, while the rod 14 is secured to the cross-piece 7 of the sliding frame. One end of the spring bears against a shoulder 15 within the housing and the other presses against the enlarged base of the rod 14. Thus the spring constantly tends to maintain the inner frame C in its forward position with relation to the stationary frame A. Co-operating with the spring 12, but located near the bottom of the frames, is a weight 16, adjustably mounted on a bent lever 17. The said bent lever is pivoted in or upon a standard 18, which standard is secured by bolts or otherwise to what I call a "slide-box" 19. The latter is itself secured by bolts or otherwise to a bar 20, lying upon and secured to the lower cross-pieces 3 of the stationary frame A. In the slide-box 19 above the bar 20 is an opening 21, in which a guide-bar 22 is adapted to reciprocate. The length of the slide-box 19 furnishes a sufficient bearing for the guide-bar 22 so that the said guide-bar always maintains the same direction during its reciprocation. Now the guide-bar 22 is secured to the under side of the lower cross-bars 7 7 of the sliding frame C in any suitable manner. Accordingly the reciprocations of the guide-bar 22 depend upon the forward and backward movements of the said sliding frame, and the function of the guide-bar in combination with the slide-box 19 is to keep the face of the sliding frame true to the side of a car, as will appear farther on.

To return to the action of the weight 16 and the parts connected therewith, I call attention to a tongue or rod 23, projecting from a buffer or standard 24, secured to a plate 25, which is bolted or otherwise attached to the top of the rear cross-piece 7 at the lower end of the sliding frame. By looking at Fig. 2 it will be seen that the effect of the weight 16 is to press the bent portion of the lever 17 against the rod 23, whereby to the extent of the force exerted by the said weight the inner frame is held in its forward position. A third device for accomplishing the same end, or rather a third series of devices, is comprised by a pair of barrel-springs 26 26, secured upon one of the lower cross-pieces 3 and acting against rods or bars 27 27, depending from one of the lower cross-pieces 7. Thus there are three sets of forces at work to keep the inner frame in its forward position, and these forces by their disposition are calculated to coöperate with the guide-bar 22 and the slide-box 19, as already described, to keep the forward face of the inner frame perfectly true at all times. I prefer that there should be two sets of barrel-springs 12 at the top of the inner frame, corresponding in position to the two springs 26 at the bottom thereof.

I now come to the special devices carried by the sliding frame for accomplishing the cleansing of the side of a car. One of these is the brush 28, the same having an enlarged portion 29, especially designed for reaching into the windows for cleansing purposes. Side by side with the lower parts of this brush are two rollers 30 30, preferably of soft rubber. These parts may be of cork or any other suitable material adapted to the purpose. The brush 28 is mounted so as to turn upon pivots 31 31, entering bearings 32 32 at the top and bottom of the sliding frame, on the inner sides thereof. The specific construction of the brush will be described later on. The rollers 30 30, which I call my "contact-rollers," are also adapted to turn on pivots 33 33, the lowermost of which pivots turn in bearings 34 34 on the lowermost front cross-piece 7, while the uppermost pivots turn in bearings 35 35, which bearings are screw-threaded rods adjustable up and down in the outer ends of brackets 36 36, projecting from the side walls of the uprights C′ C′.

On the central shaft of the circular brush 28 is mounted a pinion 37, which pinion is connected by intermediate gearing with cog-wheels 38 38 on the shafts of the contact-rollers 30 30. The intermediate gearing consists of small pinions mounted upon short shafts having their bearings in little plates 39 39 on the cross-piece 7 and their opposite bearings in the ends of two Y's 40 40, as seen in face view in Fig. 1 and in side view in Fig. 2. The manner in which the Y's are held up is best illustrated in Fig. 2. There is a standard 41 secured to the rear cross-piece 7 and also a standard 42 secured to the forward cross-piece 7. The Y 40 is screwed or bolted to the tops of these standards. A similar Y behind the one shown in Fig. 2 is similarly mounted, and the two Y's are connected by a cross-piece 43, one end of which appears in Fig. 2. The forward ends of the Y's are plainly seen in Fig. 1.

On one side of each contact-roller 30 is a brush 44, one of which appears at the left in Fig. 1. The other (that at the right) is covered by a guard or shield 45 for preventing the spattering of the water which is directed upon the contact-roller at this point. The guard or shield also serves to insure that the water delivered here shall be carried to the contact-roller and cleanse the same in case it may have become gritty or dirty in use or while standing idle. A similar shield will ordinarily be applied to the left-hand roller; but it has been partly removed in Fig. 1 to show the brush 44. These brushes last referred to are secured in any suitable manner to the forward uprights C′ C′ of the sliding frame C. The shields 45 are of sheet metal by preference, and they are secured by soldering or otherwise to the pipes which deliver water for cleansing purposes. Other shields of like character are shown at 47 47 on the inner sides of the contact-rollers 30 30 and connected to pipes which are located in proximity to the said inner sides.

The next thing to be described is the system of conducting-pipes which carry water to the points where it is to be applied. It will be assumed that the water has sufficient head to give considerable pressure. The pipe through which the water enters is shown at 50, having a branch 51, which runs across the railway-track for supplying a machine on the other side thereof. Another branch 52 contains a valve 53 with a leaf or lug 54 attached thereto. The said leaf or lug is slotted at 55, and through the slot the end 56 of a spring 57 passes. The said end of the spring is enlarged and made wider than the slot on both sides of the leaf. In this way either a forward or backward movement of the spring will move the leaf and operate the valve by positive action.

Instead of enlarging the end of the spring, I prefer, as a matter of construction, to let the slot 55 surround the middle of a flat spool or double T, and to one end of this I attach the free end of the spring 57. The other end of the said spring is secured, as shown, to the outer end of an angular lever 58, pivoted at its angle at the point 59 and at its opposite end at the point 60. The bearing 61 for the pivot 60 is supported upon a bracket 62, secured to one of the uprights C′ of the sliding frame. A detail view of this is shown in Fig. 14. The pivot 59 is mounted in lugs secured to the upright A′ of the stationary frame either directly or through bracket 63, appearing both in Figs. 1 and 2. In the bracket 62 is a slot 64, wherein the pivot 60 may sufficiently play to take up the downward movement of the said pivot when the sliding frame is moved backward. Now such backward movement of the sliding frame will manifestly result in a downward movement of the outer end of the angular lever 58 and a consequent movement of the spring 57 and the valve which it operates. This movement opens the valve and lets on the water. When it is remembered that the sliding frame is moved backward by the pressure of a car side upon the contact-rollers, it will be understood that the water is automatically turned on when it is needed. After the car has been washed and has passed beyond the rollers the force of the springs 12 12 and 26 26 and of the weight 16 will restore the sliding frame and close the valve 53 once more, thus automatically cutting off the water.

Proceeding now with the system of the pipes, one branch, beyond the valve 53, passes upward, as shown at 69. This branch runs away from the spectator and across the machine, as shown in Fig. 2, passing forward by way of pipe 70 to join pipe 71, appearing at the right in Fig. 1. Another branch is shown at 72. This branch, broken away in Fig. 2, is shown in Fig. 1 as extending upward and running back above the railway-track and at one side thereof. The main line of pipe runs upward at 73 and passes over the rotary brush and down one side thereof, connecting with the pipe 71, already referred to. A short branch runs from pipe 73 to the inner wall of one of the uprights C' of the inner frame. This branch is numbered 74. Other branches from pipe 71 run along the sides of the rotary brush, between that and the sides of the contact-rollers 30 30. The upper ends of the pipe 71 run along beside the brushes 44 44 to deliver water upon the contact-rollers, as above set forth. Wherever it is found useful, these pipes are provided with perforated pintles or tips, through which the water under pressure is discharged at the proper points. In order to allow for the moving of a part of pipe 73—that part connected with the sliding frame—with relation to another part, a piece of rubber hose 80 is used for making a joint between these two parts. The action is obvious.

It will be understood already that the described pipe 72 runs back along the train for the purpose of discharging water upon the car sides just below the molding forming the outer base of the roof. At various points branch pipes, one of which is shown at 81, are run down from the upper horizontal portion of the pipe 72, the said branch pipe being provided with tips for discharging water against the car sides. Thus it is clear that all parts of every car behind the first and also the rear portion of the first car will be sprinkled and thoroughly wet many times before they reach the brush which does the final work of cleansing. As to the forward end of the first car, that also is wetted in advance of the brush, but only through the branch pipe 74 and the main pipe 73 or a portion thereof.

Now as to the operation. By looking at Fig. 2 one will see that the side of the car 1 (which has passed beyond the machine) extends somewhat back of the line marking the forward edge of the contact-rollers, as well as back of the forward edge of the rotary brush. The line which marks the side of the car is the broken line 82. Accordingly the car side in passing the machine has had to push back the contact-rollers. This is done by every car that passes. I have so constructed my machine and I so place it with relation to the railway-track that even with the narrowest car in use the contact-rollers will still line within the line of travel of the side of the car. The only solid portions of my machine which are struck by the car sides are the contact-rollers. Of course the yielding bristles or fibers constituting the outer portion of the rotary brush are also brought into contact with the car, but no solid part except the rollers. The latter being made of soft rubber or some other substance not calculated to abrade or scratch the varnish on the car, and being, further, kept clean by the brushes 44, as will appear later on, there is no danger of my apparatus doing any injury to the cars. The friction between the contact-rollers and the car sides is enough, however, to cause a rotation of the said rollers upon their pivots. This gives rise to a rotation of the brush also through the medium of the gear-wheels 38 38, the intermediate pinions, and the pinion 37 on the shaft of the brush. As the car goes along the brush is vigorously applied to the sides and windows thereof, and the latter are thoroughly cleaned. At the same time the brushes 44 44, acting in conjunction with the water ejected from the pipe 71, thoroughly clean the rollers themselves.

In the foregoing description of the operation it has been assumed that the car in passing has pushed back the sliding frame to a greater or less distance, according to the width of the car, and that the valve 53 has been opened and the water let on. Lest a very wide car should turn the valve too far and shut off the water again, I have provided a stop 85 on one of the timbers B to limit the motion of the leaf 54. The part 57 being a spring and there being some play within the slot 55, there will be no danger of serious injury to the spring 57.

The action of the springs 12 12 and 26 26 and of the weight 16 in resisting the backward motion of the inner frame and in restoring it after the passing of a car, and the action of the said spring, in conjunction with the guide-bar 22 and the slide-box 19, for keeping the inner frame true to the side of a car, have been fully set forth in an earlier part of this specification. By reason of the presence of the rollers 5 5 and the general adaptation of the parts to each other the reciprocating movements of the sliding frame are accomplished with great smoothness. As to the resistance of the frame to such movements, it can be regulated by the strength of the springs 12 12 and 26 26, combined with the weight and adjustment of the counterpoise 16. This last-named element of my apparatus I prefer to look upon as my "contact-regulator," and I commonly so describe it in speaking of my machine.

It being known that there is a maximum difference—say two inches—between the widths of the largest and smallest cars, I may provide a stop or limiting device for the forward and backward movement of my sliding frame. This limiting device appears in small form in Fig. 2 and in detail in Fig. 11 of the drawings. It consists, essentially, of a bent arm 86, attached to the stationary frame A, or rather to one of the upper cross-pieces 3 thereof, the said bent arm carrying a pin 87, which extends upward into a slot 88 in a plate 89, attached to one of the cross-pieces 7 of the inner frame. The play of the inner frame is limited by the length of the slot 88, as will be clearly understood. Coöperating with the described limiting device is a similar one in the rear of the machine near the bottom. This consists of a pin 90, secured in a block 91 on the slide-box 19 and resting in a slot 92 in the plate 25. It will be remembered that the plate 25 is secured to the sliding frame, and it will be obvious that the said frame can move no farther either way than is permitted by the walls of the slot 92 in conjunction with the pin 90.

In the plan view of a modification shown in Fig. 3 I provide besides the rotary brush 28 (which rotates on a vertical axis) a second rotary brush 95, rotating on a horizontal axis. The main differences reside in the different arrangement of the gearing and in the substitution for the Y's 40 40 of angle-bars 96 96 to form suitable bearings for a different set of gearing called for by this style of apparatus. I need not describe these angle-bars in all their details, it being only necessary to say that they form the upper bearings for the gear-wheels and pinions shown in Fig. 4. The motion is transmitted, as before, from the contact-rollers 30 30 through the medium of gear-wheels 38 on the shafts of the said rollers. Motion is transmitted to the vertical rotary brush 28 in much the same manner as before; but the horizontal rotary brush receives its motion as follows: from the gear-wheel 97 to the bevel-wheel 98 above it on the same shaft to an engaging bevel-wheel 99 on the horizontal shaft 100, and thence by means of the bevel-wheels 101 and 102 to the horizontal shaft 103, carrying the brush 95. The rotation of the contact-rollers under friction from the car sides here causes a rotary movement not only of the brush 28, but also of the brush 95. It is evident that by slight alterations of the gearing or additions thereto I might set in operation as many brushes as I pleased against the car side and in whatever relation might suit me.

In Fig. 5 I illustrate an arrangement for operating a brush by means of power derived from an independent motor. Assuming that the driving-shaft is that which appears 104, it is evident that motion is transmitted therefrom by means of the engaging bevel-wheels 105 and 106, the shaft 107, the sprocket-wheel 108, the sprocket-chain 109, the sprocket-wheel 110, the shaft 111, the gear-wheels 112 and 38, and certain pinions (not seen in Fig. 5, but similar to those shown in Fig. 1) running to a corresponding pinion at the bottom of the brush 28. In other words, the system of gearing between the gear-wheel 38 in Fig. 5 and a pinion (not shown) controlling the rotary brush 28 is identical with that appearing in Fig. 1 between the same parts. It is to be noted, however, that the gear-wheel 38 is in the present instance in such relation to the contact-roller 30 that the latter is not moved with the gear-wheel. This is brought about by reason of the fact that the shaft of the contact-roller is made round where it passes through the roller and has sufficient play within the hub or eye of the roller, so that it can rotate freely therein. A detail of this part of the structure is shown in Fig. 9. The hub or eye referred to is shown at 115 as made up of two thimbles, through which the shaft passes. The rims of the thimbles are in the form of flanges which extend out at the top and bottom of the roller 30 and receive bolts 116 116, which run through them and through the body of the rubber. The whole structure constituting the roller is thus made firm and unitary, while it is in this instance independent of the movement of the shaft on which it is mounted. It will be seen that the said shaft (which I will designate by the number 117) is square or angular below the roller and that it carries a collar 118, designed to form a smooth bearing-surface for the spool 115 to rest upon without being moved around with the shaft. This being the construction of the shaft of the roller 30 and both of the rollers 30 appearing in the machine illustrated in Fig. 5, it is manifest that the function of the gear-wheel 38 is simply to transmit motion to the system of gearing beyond, which is connected with the rotary brush 28. In other words, while the contact-rollers 30 will, as before, rub against the car sides as the train passes by, yet the use of the said rollers will in this modified form of apparatus be to cause the sliding back of the frame C and the opening of the valve 53 for letting on the water. The rotation of the said contact-rollers will not in any manner cause the rotation of the cleansing-brushes, such rotation of the brushes being due to some outside force transmitted over the driving-shaft 104, as already described.

In order to economize in the number of motors employed and to make it unnecessary to have a separate motor for each machine, I provide for transmitting power from the same driving-shaft 104 not only to the machine illustrated in Fig. 5, but also to the corresponding machine on the opposite side of the track. To this end I place a beveled wheel 119 on the bottom of the shaft 111 and cause this bevel-wheel to engage with corresponding bevel-wheels 120 and 121 on a horizontal shaft 122. The last-named shaft is a divided shaft of angular cross-section, preferably square, and it carries a sleeve having an opening with corresponding angles, which sleeve unites the divided shaft, so that it may rotate as a single shaft, as will be well understood. I have shown the line of division in dotted lines within a sleeve 123. Now one part of this shaft is rounded after it leaves the sleeve 123 and is adapted to rotate in suitable journals, one of which is shown at 124. The said shaft after passing through the journal 124 (the shaft is represented in the drawings as broken off at 125) crosses the track, passes through a similar journal, and is connected with the machine on the opposite side in the same manner as the driving-shaft 104 is connected with the machine shown in Fig. 5.

The reason why the divided shaft 122 needs to have any division and to be united by the sleeve 123 is that the operating parts connected with the shaft 111 (and including one part of the divided shaft 122) are mounted on the sliding frame and partake of its motion. For this reason the shaft 122 needs to be elongated and shortened successively in the operation of the machine. The function of the bevel-wheel 121 is to cause a positive retraction of one part of the shaft 122 when the frame and its connected parts slide backward. The said bevel-wheel 121, however, is loosely mounted on a rounded portion of the shaft 122 and does not tend in any way to cause the said shaft to rotate.

It is to be remembered that the structure illustrated in Fig. 9 is a modified structure called for by the requirements of a system in which the motive power comes from an outside source. The usual structure of the contact-rollers in relation to their supporting-shafts is illustrated in Fig. 10. In this figure the square shaft of a contact-roller extends through a square opening in the said roller, and upper and lower flanges 130 and 131, with bolts running through them and through the body of the roller, furnish the remaining means of uniting the parts. With this construction the contact-roller and its shaft will always rotate together.

Figs. 6 and 7 show the framework of the different styles of brushes which I have illustrated in several of the figures of the drawings. Fig. 6 gives details of one of my vertical rotary brush-frames. At the left is an elevation of such a frame, broken away at the bottom. At the right, near the top, is a plan of the brush-frame with its cap removed, and below this is a plan with the cap in place. The frame is made up of a square bar of wood or other suitable material, having its corners cut off. The top of this piece of wood is seen at 132. It extends, preferably, the whole length of the brush. At each of the cut-off corners a strip 133, of metal or any rigid material, is bolted to the central bar. The edges of these strips project beyond the bar in such a manner as to form dovetails capable of receiving suitably-formed plates or backs 134. The said plates or backs are perforated in the usual manner to receive bristles or fibers constituting the brush. I prefer to make these backs in the form of short slides and to put them in one after the other until the whole length of the brush has been built up. After being put in place they are held there by the cap 135, which is secured by bolts to the top of the bar 132. A foot-piece precisely like the cap is provided at the bottom of the bar 132 to hold the slides at that end.

A brush-back 136, suited to the brush 95, (shown in Fig. 3,) is illustrated in Fig. 7. This back is made up of a flat disk 137, preferably of wood, to which is screwed or bolted a rim 138. The shape of the rim is clearly seen in the section appearing at the upper part of Fig. 7. It is only necessary to say that the shape is such as to leave a circular dovetail inside the rim all the way around. Inside this rim are cross-pieces 140 and 141, which are halved together in the usual manner, leaving their tops flush with the top of the rim. It will be observed that the ends of these cross-pieces assume the dovetail form and are held firmly in place by the rim. Moreover, the said cross-pieces are themselves dovetailed longitudinally on their under sides, and the structure is then ready to receive the quadrantal segments 150 150, which when in place complete the brush-back. The outer edges of these segments are suitably dovetailed, and their front surfaces are flush with the cross-pieces and with the rim. In practice the cross-pieces will first be put in place, then the segments pushed in, and finally the rim (which is preferably constructed in halves) will be screwed or bolted to the disk 137.

The detail shown in Fig. 8 will be easily understood. It is an antifriction-pivot representing one of those which I prefer to employ in my gearing-bearings and wherever in my apparatus rotary shafts are to be placed. I drop into the socket shown at 151 a conical button 152, which lies flat in the bottom of the socket, with its point directed outward toward the opening of the socket. The pivot 33 (or any of the other pivots in my apparatus) is similarly cone shape at its outer end, and the points of the cones are brought together inside the socket. To insure the points coming and remaining together, I provide the bearing-plates 39 of metal, which will not quickly become worn.

At 157 I show an oil-duct through which oil may be conveyed to assist in rendering the bearing frictionless.

Having described my invention, I claim—

1. In a machine for washing the side of a car or other vehicle, a stationary frame arranged alongside the track, a moving or sliding frame mounted upon the said stationary frame and carrying one or more brushes and one or more contact-rollers, extending into the path of motion of one side of the car or other vehicle to be cleansed, the brush or brushes being adapted to move upon the said car or vehicle, and mechanism intermediate between the said contact roller or rollers and the said brush or brushes, for causing the movement of the latter, the said stationary and moving frames being provided with limiting devices for limiting the relative movement of the two frames, as set forth.

2. In a machine for washing cars or other vehicles, two frames, one of which is movable with relation to the other, one or more contact-rollers on the movable frame, and one or more brushes in the path of motion of a car side, in combination with means tending to maintain the moving frame in its forward position with respect to the railway-track, the said contact roller or rollers extending into the path of motion of one side of the car or other vehicle to be cleansed, and mechanism intermediate between the said contact roller or rollers and the said brush or brushes, for causing the movement of the latter, as set forth.

3. In a machine for washing cars or other vehicles, two frames having a relative movement, one or more contact-rollers on one of the frames extending into the path of motion of one side of the car or other vehicle to be cleansed, one or more brushes adapted to move upon the side of the said car or vehicle, and mechanism intermediate between the said contact roller or rollers and the said brush or brushes, for causing the movement of the latter, as set forth.

4. In a machine for washing cars or other vehicles, a stationary frame arranged alongside the path of movement of the said car or vehicle, a moving or sliding frame mounted upon the said stationary frame and carrying one or more contact devices which extend into the said path of motion, and a suitable guide or guides upon the said frames whereby the moving frame will be kept true to the path of motion in all its positions, as set forth.

5. In a machine for washing cars or other vehicles, a stationary frame arranged alongside the path of movement of the said car or vehicle, a moving or sliding frame mounted upon the said stationary frame and carrying one or more contact-rollers which extend into the said path of movement, and also carrying one or more brushes adapted to move upon the side of the said car or vehicle, a system of water-pipes arranged alongside the path of motion of the car or vehicle, and a valve-controlling device carried by the said sliding frame, and mechanism intermediate between the said contact roller or rollers and the said brush or brushes, for causing the movement of the latter, as set forth.

6. In a machine for washing cars or other vehicles, a stationary frame and a sliding frame, the latter carrying one or more contact-rollers and also one or more cleansing-brushes, the said sliding frame being mounted upon rails which travel upon suitable rollers pivoted in the stationary frame, the said roller or rollers extending into the path of motion of one side of the car or other vehicle to be cleansed, and the said brush or brushes being adapted to move upon the side of said car or vehicle, together with mechanism intermediate between the said contact roller or rollers and the said brush or brushes, for causing the movement of the latter, as set forth.

7. In a machine for washing cars or other vehicles, a pair of relatively-moving frames, one carrying a contact roller or rollers in the path of motion of one side of the car or other vehicle, and also carrying one or more brushes adapted to move upon the side of the said car or vehicle, in combination with a valve-controlling device operated by the movement of the said moving frame, the said valve-controlling device being operatively connected with a valve in a system of water-pipes, the parts being so arranged that when the moving frame is operated, the water will be let on by the valve and will be discharged against the car side, where the brush or brushes will utilize it for cleaning the cars, the said brush or brushes being themselves operated by the contact roller or rollers through suitable intermediate mechanism, as set forth.

8. In a machine for washing cars or other vehicles, a system of water-pipes arranged alongside the said car or other vehicle, a valve in one of the said water-pipes, and a valve-controlling device operated by a sliding frame, the said sliding frame carrying one or more contact-rollers in the path of motion of one side of the said car or vehicle, the connection between the said valve-controlling device and the said valve being a spring or yielding connection, in combination with a stop or detent for the said valve, as set forth.

9. In a machine for washing cars or other vehicles, a stationary frame and a sliding frame mounted within the said stationary frame, the said sliding frame carrying one or more contact-rollers and one or more brushes, the former extending into the path of motion of one side of the said car or vehicle, and the latter being adapted to move upon the side of the car or vehicle, mechanism intermediate between the said contact roller or rollers and the said brush or brushes, for moving the latter, in combination with springs at the top and bottom of the said frames, the said springs being adapted to urge the inner frame forward, as set forth.

10. In a machine for washing cars or other vehicles, a rectangular stationary frame having cross-pieces at the top and bottom, a similarly-shaped sliding frame mounted within the stationary frame and also having cross-pieces at the top and bottom, and springs corresponding in position at the top and bottom of the said frames, the said springs being adapted to urge the inner frame to its forward position and maintain its face true in every position, as set forth.

11. In a machine for washing cars or other vehicles, a stationary frame, a sliding frame carrying a brush and also carrying one or more contact-rollers, a system of gearing connecting the brush and the contact roller or rollers, the elements of the said system of gearing being all mounted upon the sliding frame and adapted to move therewith, as set forth.

12. In a machine for washing cars or other vehicles, one or more contact-rollers in the path of movement of the side of the car or vehicle, in combination with a frame supporting the said contact roller or rollers, and being adapted to slide in suitable guides, a perforated pipe in proximity to the said contact roller or rollers, and a valve in the said pipe operatively connected with the said sliding frame, as and for the purposes set forth.

13. In a machine for washing cars or other vehicles, a system of water-pipes arranged alongside the track or path of movement of said cars or other vehicle, a series of openings in the said water-pipes on the side of said car or other vehicle, a pair of frames the elements of which have a relative movement and also support a portion of the system of water-pipes, in combination with a flexible hose for uniting the parts of the system of water-pipes which are mounted on the two frames respectively, a valve in the said system of water-pipes, and a valve-controlling device operated by the movement of one of the frames, the said moving frame carrying one or more contact-rollers in the path of motion of one side of the said car or vehicle and one or more contact-brushes adapted to move upon the side of said car or vehicle, and mechanism intermediate between the said roller or rollers and the said brush or brushes for moving the latter, as set forth.

14. In a rotary cleansing-brush, a rectangular bar, having its corners cut off and covered with strips extending beyond the cut-off portion, in combination with holders, carrying bristles, and adapted to fit the dovetailed recesses formed by the said strips, and caps holding the said strips in place as set forth.

In testimony whereof I have signed my name, in the presence of two witnesses, this 10th day of October, A. D. 1896.

CHARLES L. KLINE.

Witnesses:
G. H. STOCKBRIDGE,
PETER J. STUYVESANT.